Patented July 9, 1935

2,007,419

UNITED STATES PATENT OFFICE 2,007,419

PROCESS FOR MANUFACTURING A NITROGEN FERTILIZER

Gerrit Berkhoff, Jr., Kerensheide, Netherlands, assignor to De Directie van de Staatsmijnen in Limburg, Heerlen, Netherlands, a corporation of the Netherlands No Drawing. Application January 6, 1932, Serial No. 585,166. In The Netherlands January 12, 1931

2 Claims. (Cl. 71—9)

This invention relates to fertilizers, and more particularly to ammonium nitrate. As is well known, ammonium nitrate would be an excellent fertilizer, because it contains nitrogen both in the form of ammonia as in the form of nitrate and is completely assimilable by the plants so that it does not leave any residue in the soil, if it were not prohibited, practically speaking, due to its hygroscopic and explosive nature.

In order to overcome these drawbacks, it has been proposed to add to the ammonium nitrate in the solid, cold phase, some other substance to modify its hygroscopic nature so that caking of ammonium nitrate in storage would be practically eliminated. To obtain this result, it has been proposed to mix solid ammonium nitrate with solid ammonium sulphate (cf. Dutch Patent No. 7659); or by mixing solid ammonium nitrate with calcium carbonate; or by mixing solid $NH_4NO_3$ with the lime residue obtained by the conversion of gypsum with ammonia and carbonic acid (cf. German Patent No. 336,876). It has also been proposed to prepare a similar fertilizer by adding to a hot ammonium nitrate fusion, solid, inorganic, assimilable, fertilizing salts, the latter heated or not, and to allow the obtained mixture to crystallize (cf. the German Patents Nos. 372,065 and 375,375, and the Dutch Patent No. 21,391).

In order to diminish, or eliminate the explosiveness of the ammonium nitrate, and make the fertilizer safe to be handled by inexperienced farmers, it has been proposed to add to the ammonium nitrate, a substance which at the same time would reduce the hygroscopicity and the explosiveness of the ammonium nitrate.

In either case, so-called "mixed fertilizers" are obtained, and in the use of these mixed products, substances which are undesirable for the plants may be brought into the soil together with the completely assimilable ammonium nitrate. For some soils or for some plants, it may be objectionable to use ammonium nitrate mixed with, for example, ammonium sulphate or calcium carbonate; moreover, these latter substances may influence the acidity or the lime content of the soil in an undesirable way. On the other hand agriculturists prefer, in many cases, "simple or single-element fertilizers" to the "mixed fertilizers", as the former enable them to add each fertilizer element, such as K, or P, or Ca, or N, etc. exactly and independently, when K, or P, or Ca, or N is the only element needed by that particular soil for that particular crop at that particular time.

According to this invention, a non-hygroscopic and non-explosive fertilizer of which ammonium nitrate is the base and the only fertilizing or plant-assimilable constituent, is obtained by adding to concentrated, fused ammonium nitrate,— which nevertheless contains still a small percentage of water,—one or more substances, heated or unheated, which are natural, unassimilable, non-fertilizing constituents of the soil, i. e., substances either derived from, or transformed into, non-essential soil constituents, used by the plant only as an anchorage or bed, and formed by natural processes such as by weathering or otherwise; such as loam, kaolin, sand, stone, grits, clays and the like, and by allowing or causing the product so obtained to crystallize. By the "natural constituents of the soil" those substances are thus meant, which in themselves cannot be assimilated by the plant as plant-food nor are they nutritious matter for the plants, and if they contain the plant-food elements Ca, P, K, and N, they occur unknown and as impurities only.

Conversely, according to the present invention, fused ammonium nitrate in which only a few percent of water remains, may be added continuously to a current of one or more of the above-mentioned substances, and the product so obtained may be allowed to crystallize.

By these processes, a valuable simple, single-element, nitrogen-fertilizer is obtained in the form of a practically waterfree product, and moreover there is obtained from that explosive and hygroscopic nitrogen-salt, $NH_4NO_3$, a single-element fertilizer which is not liable to explode, does not cake, lump-up, or harden in storage, and remains in granular form and easily distributable over the soil. Again the use of this present fertilizer does not modify the chemical character of the soil, because the substances which are added in order to remove the above drawbacks inherent to the use of pure ammonium nitrate, are universal and average soil-constituents.

*Example*

A concentrated solution of ammonium nitrate, at a temperature of 130° C., and consisting of ammonium nitrate and water, is mixed-up,— suitable means being employed for obtaining a homogeneous mixture,—with hot, dried loam (not containing soil-water soluble, or plant-assimilable plant-food). After mixing, the product is made to crystallize by spraying, or by means of a cooling drum, after which the grains formed are collected, dried at approximately 100° C. in a rotating drum, and subsequently cooled down. The product obtained, which possesses excellent qualities as a fertilizer, due to the NH4NO3, has a nitrogen content of 20.5%. One-half the nitrogen is present in the form of ammonia nitrogen, the other half in the form of nitrate nitrogen.

What I claim is:

1. A process for manufacturing from ammonium nitrate a simple, single-compound, nitrogen-fertilizer, which comprises making a fusion of water-containing ammonium nitrate, and mixing the ammonium nitrate while still in the molten condition with one or more generally-occurring, naturally-produced soil constituents which themselves are non-assimilable by plants, and which are in an amount sufficient to produce a resulting non-explosive, non-hygroscopic fertilizer which may be stored without hardening, caking or lumping and remains in granular form and easily distributable over the soil.

2. A simple, single-compound, non-caking, non-explosive nitrogen fertilizer which comprises a granular, homogeneous mixture of ammonium nitrate previously fused while containing water and one or more generally-occurring, naturally-produced, non-assimilable soil constituents which, if at all, contain the elements calcium, phosphorus, potassium and introgen, as incidental impurities only, the soil constituents being present in an amount sufficient to produce a resulting non-explosive non-hygroscopic fertilizer which may be stored without inconvenience and remains easily distributable over the soil.

GERRIT BERKHOFF, Junior.